US009666206B2

(12) United States Patent
Unno

(10) Patent No.: US 9,666,206 B2
(45) **Date of Patent: *May 30, 2017**

(54) METHOD, SYSTEM AND COMPUTER PROGRAM PRODUCT FOR ATTENUATING NOISE IN MULTIPLE TIME FRAMES

(75) Inventor: Takahiro Unno, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 606 days.

This patent is subject to a terminal disclaimer.

(21) Appl. No.: 13/589,237

(22) Filed: Aug. 20, 2012

(65) Prior Publication Data

US 2013/0054232 A1 Feb. 28, 2013

Related U.S. Application Data

(60) Provisional application No. 61/526,962, filed on Aug. 24, 2011.

(51) Int. Cl.

| | |
|---|---|
| ***G06F 15/00*** | (2006.01) |
| ***G10L 19/00*** | (2013.01) |
| ***G10L 21/00*** | (2013.01) |
| ***G10L 21/04*** | (2013.01) |
| ***G10L 21/0208*** | (2013.01) |

(Continued)

(52) U.S. Cl.

CPC .......... *G10L 21/0208* (2013.01); *G10L 25/18* (2013.01); *G10L 2021/02165* (2013.01)

(58) Field of Classification Search

CPC ............. G10L 21/0208; G10L 21/0232; G10L 2021/02166; G10L 2021/02165; G10L 21/0216; G10L 2021/02082; G10L 2021/02087; G10L 21/02; G10L 25/84;

(Continued)

(56) References Cited

U.S. PATENT DOCUMENTS 4,811,404 A * 3/1989 Vilmur et al. ............... 381/94.3
5,706,395 A * 1/1998 Arslan et al. ................ 704/226

(Continued)

FOREIGN PATENT DOCUMENTS

TW EP 2006841 A1 * 12/2008 ......... G10L 21/0208

OTHER PUBLICATIONS

Ephraim et al., "Speech Enhancement Using a Minimum Mean-Square Error Short-Time Spectral Amplitude Estimator", IEEE Transaction on Acoustics, Speech, and Signal Processing, Dec. 1984, pp. 1109-1121, vol. ASSP-32, No. 6, IEEE.

(Continued)

*Primary Examiner* — Michael Ortiz Sanchez

(74) *Attorney, Agent, or Firm* — Michael A. Davis, Jr.; Charles A. Brill; Frank D. Cimino

(57) ABSTRACT

At least one signal is received that represents speech and noise. In response to the at least one signal, frequency bands are generated of an output channel that represents the speech while attenuating at least some of the noise from the at least one signal. Within a kth frequency band of the at least one signal: a first ratio is determined of a clean version of the speech for a preceding time frame to the noise for the preceding time frame; and a second ratio is determined of a noisy version of the speech for the time frame n to the noise for the time frame n. In response to the first and second ratios, a gain is determined for the kth frequency band of the output channel for the time frame n.

24 Claims, 4 Drawing Sheets

(51) Int. Cl.
*G10L 21/0216* (2013.01)
*G10L 25/18* (2013.01)

(58) Field of Classification Search
CPC .............. G10L 21/0364; H04R 1/1083; H04R 2410/01; H04R 2410/05
USPC .................................. 704/200–257, 500–504
See application file for complete search history.

(56) References Cited

U.S. PATENT DOCUMENTS

| | | | | |
|---|---|---|---|---|
| 2004/0049383 | A1* | 3/2004 | Kato | G10L 21/0208 704/226 |
| 2007/0055505 | A1* | 3/2007 | Doclo | G10L 21/0208 704/226 |
| 2008/0167866 | A1* | 7/2008 | Hetherington | G10L 21/0208 704/228 |
| 2009/0012786 | A1* | 1/2009 | Zhang | G10L 21/0208 704/233 |
| 2009/0106021 | A1* | 4/2009 | Zurek | G10L 21/0208 704/226 |
| 2009/0164212 | A1* | 6/2009 | Chan et al. | 704/226 |
| 2009/0254340 | A1* | 10/2009 | Sun | G10L 21/0208 704/226 |
| 2009/0310796 | A1* | 12/2009 | Seydoux | H04M 9/082 381/71.1 |
| 2011/0123019 | A1 | 5/2011 | Gowreesunker et al. | |
| 2013/0046535 | A1* | 2/2013 | Parikh et al. | 704/226 |
| 2013/0246060 | A1* | 9/2013 | Sugiyama | G10L 21/0208 704/226 |

OTHER PUBLICATIONS

Parikh et al., “Perceptual Artifacts in Speech Noise Suppression”, IEEE, 2010, pp. 99-103, Asilomar, Georgia Institute of Technology, Atlanta, GA, U.S.A.

Parikh et al., “Gain Adaptation Based on Signal-To-Noise Ratio for Noise Suppression”, IEEE Workshop on Applications of Signal Processing to Audio and Acoustics, Oct. 18-21, 2009, pp. 185-188, IEEE, New Paltz, NY.

Takahashi et al., “Blind Spatial Subtraction Array for Speech Enhancement in Noisy Environment”, IEEE Transactions on Audio, Speech, and Language Processing, May 2009, pp. 650-664, vol. 17 No. 4, IEEE.

Parikh et al., “Blind Source Separation with Perceptual Post Processing”, IEEE DSP/SPE, 2011, pp. 321-325, Georgia Institute of Technology, Atlanta, GA, U.S.A.

Anderson, David V., “A Modulation View of Audio Processing for Reducing Audible Artifacts”, IEEE ICASSP, 2010, pp. 5474-5477, Georgia Institute of Technology, Atlanta, GA, U.S.A.

Cappe, Oliver, “Elimination of the Musical Noise Phenomenon with the Ephraim and Mulah Noise Suppressor”, Cappe: Elimination of the Musical Noise Phenomenon, Apr. 21, 1994 rev. Oct. 14, 1993, pp. 345-349, IEEE, Paris, France.

* cited by examiner

METHOD, SYSTEM AND COMPUTER PROGRAM PRODUCT FOR ATTENUATING NOISE IN MULTIPLE TIME FRAMES

CROSS-REFERENCE TO RELATED APPLICATION

This application claims priority to U.S. Provisional Patent Application Ser. No. 61/526,962, filed Aug. 24, 2011, entitled JOINT A PRIORI SNR AND POSTERIOR SNR ESTIMATION FOR BETTER SNR ESTIMATION AND SNR-ATTENUATION MAPPING IN NON-LINEAR PROCESSING NOISE SUPPRESSOR, naming Takahiro Unno as inventor, which is hereby fully incorporated herein by reference for all purposes.

BACKGROUND

The disclosures herein relate in general to audio processing, and in particular to a method, system and computer program product for attenuating noise in multiple time frames.

In mobile telephone conversations, improving quality of uplink speech is an important and challenging objective. For attenuating noise, a spectral subtraction technique has various shortcomings, because it estimates a posteriori speech-to-noise ratio ("SNR") instead of a priori SNR. Conversely, a minimum mean-square error ("MMSE") technique has various shortcomings, because it estimates a priori SNR instead of a posteriori SNR. Those shortcomings are especially significant if a level of the noise is high.

SUMMARY

At least one signal is received that represents speech and noise. In response to the at least one signal, frequency bands are generated of an output channel that represents the speech while attenuating at least some of the noise from the at least one signal. Within a kth frequency band of the at least one signal: a first ratio is determined of a clean version of the speech for a preceding time frame to the noise for the preceding time frame; and a second ratio is determined of a noisy version of the speech for the time frame n to the noise for the time frame n. In response to the first and second ratios, a gain is determined for the kth frequency band of the output channel for the time frame n.

DETAILED DESCRIPTION

Figure 1:
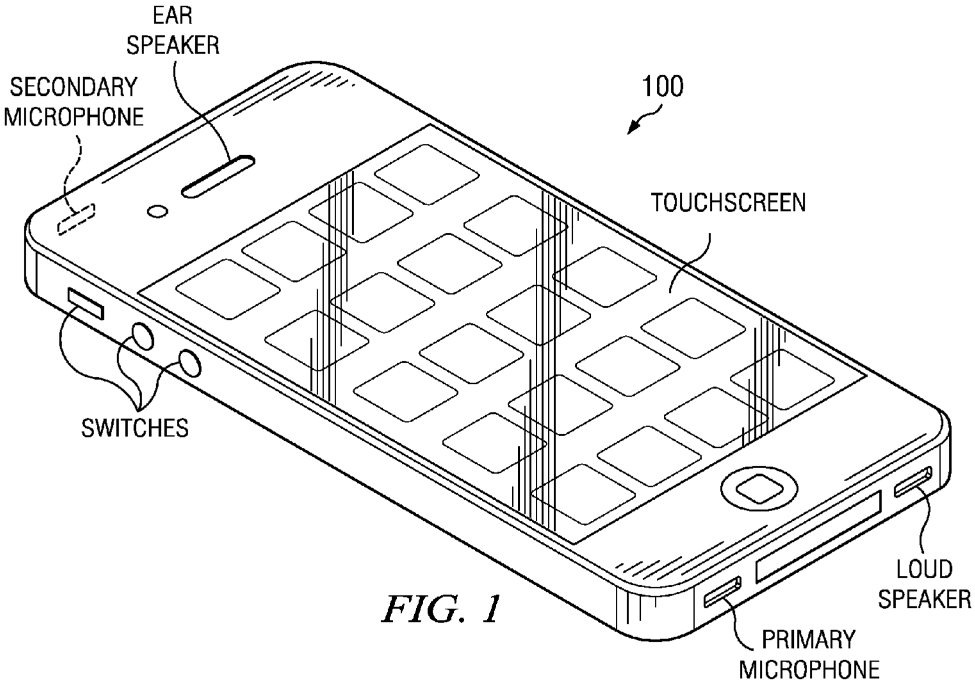
FIG. 1 is a perspective view of a mobile smartphone that includes an information handling system of the illustrative embodiments.

FIG. 1 is a perspective view of a mobile smartphone, indicated generally at 100, that includes an information handling system of the illustrative embodiments. In this example, the smartphone 100 includes a primary microphone, a secondary microphone, an ear speaker, and a loud speaker, as shown in FIG. 1. Also, the smartphone 100 includes a touchscreen and various switches for manually controlling an operation of the smartphone 100.

Figure 2:
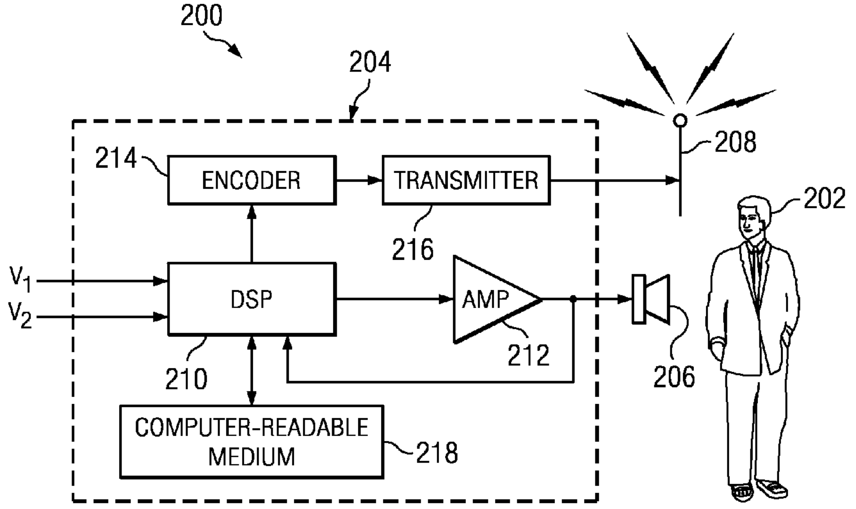
FIG. 2 is a block diagram of the information handling system of the illustrative embodiments.

FIG. 2 is a block diagram of the information handling system, indicated generally at 200, of the illustrative embodiments. A human user 202 speaks into the primary microphone (FIG. 1), which converts sound waves of the speech (from the user 202) into a primary voltage signal $V_1$. The secondary microphone (FIG. 1) converts sound waves of noise (e.g., from an ambient environment that surrounds the smartphone 100) into a secondary voltage signal $V_2$. Also, the signal $V_1$ contains the noise, and the signal $V_2$ contains leakage of the speech.

A control device 204 receives the signal $V_1$ (which represents the speech and the noise) from the primary microphone and the signal $V_2$ (which represents the noise and leakage of the speech) from the secondary microphone. In response to the signals $V_1$ and $V_2$, the control device 204 outputs: (a) a first electrical signal to a speaker 206; and (b) a second electrical signal to an antenna 208. The first electrical signal and the second electrical signal communicate speech from the signals $V_1$ and $V_2$, while suppressing at least some noise from the signals $V_1$ and $V_2$.

In response to the first electrical signal, the speaker 206 outputs sound waves, at least some of which are audible to the human user 202. In response to the second electrical signal, the antenna 208 outputs a wireless telecommunication signal (e.g., through a cellular telephone network to other smartphones). In the illustrative embodiments, the control device 204, the speaker 206 and the antenna 208 are components of the smartphone 100, whose various components are housed integrally with one another. Accordingly in a first example, the speaker 206 is the ear speaker of the smartphone 100. In a second example, the speaker 206 is the loud speaker of the smartphone 100.

The control device 204 includes various electronic circuitry components for performing the control device 204 operations, such as: (a) a digital signal processor ("DSP") 210, which is a computational resource for executing and otherwise processing instructions, and for performing additional operations (e.g., communicating information) in response thereto; (b) an amplifier ("AMP") 212 for outputting the first electrical signal to the speaker 206 in response to information from the DSP 210; (c) an encoder 214 for outputting an encoded bit stream in response to information from the DSP 210; (d) a transmitter 216 for outputting the second electrical signal to the antenna 208 in response to the encoded bit stream; (e) a computer-readable medium 218 (e.g., a nonvolatile memory device) for storing information; and (f) various other electronic circuitry (not shown in FIG. 2) for performing other operations of the control device 204.

The DSP 210 receives instructions of computer-readable software programs that are stored on the computer-readable medium 218. In response to such instructions, the DSP 210 executes such programs and performs its operations, so that the first electrical signal and the second electrical signal communicate speech from the signals $V_1$ and $V_2$, while suppressing at least some noise from the signals $V_1$ and $V_2$. For executing such programs, the DSP 210 processes data, which are stored in memory of the DSP 210 and/or in the computer-readable medium 218. Optionally, the DSP 210 also receives the first electrical signal from the amplifier 212, so that the DSP 210 controls the first electrical signal in a feedback loop.

In an alternative embodiment, the primary microphone (FIG. 1), the secondary microphone (FIG. 1), the control device 204 and the speaker 206 are components of a hearing aid for insertion within an ear canal of the user 202. In one version of such alternative embodiment, the hearing aid omits the antenna 208, the encoder 214 and the transmitter 216.

Figure 3:
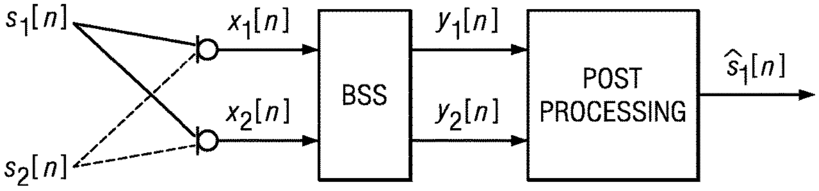
FIG. 3 is an information flow diagram of an operation of the system of FIG. 2.

FIG. 3 is an information flow diagram of an operation of the system 200. In accordance with FIG. 3, the DSP 210 performs an adaptive linear filter operation to separate the speech from the noise. In FIG. 3, $s_1[n]$ and $s_2[n]$ represent the speech (from the user 202) and the noise (e.g., from an ambient environment that surrounds the smartphone 100), respectively, during a time frame n. Further, $x_1[n]$ and $x_2[n]$ are digitized versions of the signals $V_1$ and $V_2$, respectively, of FIG. 2.

Accordingly: (a) $x_1[n]$ contains information that primarily represents the speech, but also the noise; and (b) $x_2[n]$ contains information that primarily represents the noise, but also leakage of the speech. The noise includes directional noise (e.g., a different person's background speech) and diffused noise. The DSP 210 performs a dual-microphone blind source separation ("BSS") operation, which generates $y_1[n]$ and $y_2[n]$ in response to $x_1[n]$ and $x_2[n]$, so that: (a) $y_1[n]$ is a primary channel of information that represents the speech and the diffused noise while suppressing most of the directional noise from $x_1[n]$; and (b) $y_2[n]$ is a secondary channel of information that represents the noise while suppressing most of the speech from $x_2[n]$.

After the BSS operation, the DSP 210 performs a non-linear post processing operation for suppressing noise, without estimating a phase of $y_1[n]$. In the post processing operation, the DSP 210: (a) in response to $y_2[n]$, estimates the diffused noise within $y_1[n]$; and (b) in response to such estimate, generates $\hat{s}_1[n]$, which is an output channel of information that represents the speech while suppressing most of the noise from $y_1[n]$. As discussed hereinabove in connection with FIG. 2, the DSP 210 outputs such $\hat{s}_1[n]$ information to: (a) the AMP 212, which outputs the first electrical signal to the speaker 206 in response to such $\hat{s}_1[n]$ information; and (b) the encoder 214, which outputs the encoded bit stream to the transmitter 216 in response to such $\hat{s}_1[n]$ information. Optionally, the DSP 210 writes such $\hat{s}_1[n]$ information for storage on the computer-readable medium 218.

Figure 4:
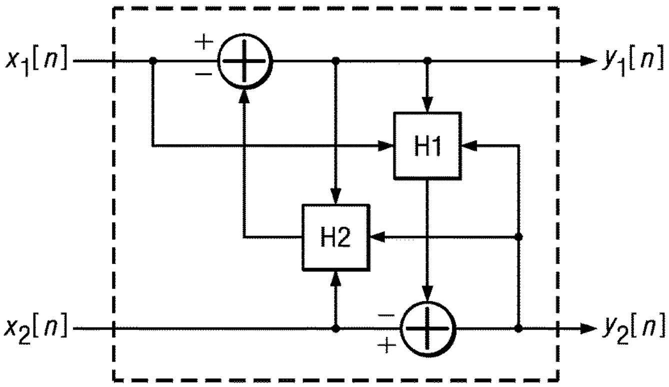
FIG. 4 is an information flow diagram of a blind source separation operation of FIG. 3.

FIG. 4 is an information flow diagram of the BSS operation of FIG. 3. A speech estimation filter H1: (a) receives $x_1[n]$, $y_1[n]$ and $y_2[n]$; and (b) in response thereto, adaptively outputs an estimate of speech that exists within $y_1[n]$. A noise estimation filter H2: (a) receives $x_2[n]$, $y_1[n]$ and $y_2[n]$; and (b) in response thereto, adaptively outputs an estimate of directional noise that exists within $y_2[n]$.

As shown in FIG. 4, $y_1[n]$ is a difference between: (a) $x_1[n]$; and (b) such estimated directional noise from the noise estimation filter H2. In that manner, the BSS operation iteratively removes such estimated directional noise from $x_1[n]$, so that $y_1[n]$ is a primary channel of information that represents the speech and the diffused noise while suppressing most of the directional noise from $x_1[n]$. Further, as shown in FIG. 4, $y_2[n]$ is a difference between: (a) $x_2[n]$; and (b) such estimated speech from the speech estimation filter H1. In that manner, the BSS operation iteratively removes such estimated speech from $x_2[n]$, so that $y_2[n]$ is a secondary channel of information that represents the noise while suppressing most of the speech from $x_2[n]$.

The filters H1 and H2 are adapted to reduce cross-correlation between $y_1[n]$ and $y_2[n]$, so that their filter lengths (e.g., 20 filter taps) are sufficient for estimating: (a) a path of the speech from the primary channel to the secondary channel; and (b) a path of the directional noise from the secondary channel to the primary channel. In the BSS operation, the DSP 210 estimates a level of a noise floor ("noise level") and a level of the speech ("speech level").

The DSP 210 computes the speech level by autoregressive ("AR") smoothing (e.g., with a time constant of 20 ms). The DSP 210 estimates the speech level as $P_s[n]=\alpha \cdot P_s[n-1]+(1-\alpha)\cdot y_1[n]^2$, where: (a) $\alpha=\exp(-1/F_s\tau)$; (b) $P_s[n]$ is a power of the speech during the time frame n; (c) $P_s[n-1]$ is a power of the speech during the immediately preceding time frame n−1; and (d) $F_s$ is a sampling rate. In one example, $\alpha=0.95$, and $\tau=0.02$.

The DSP 210 estimates the noise level (e.g., once per 10 ms) as: (a) if $P_s[n]>P_N[n-1]\cdot C_u$, then $P_N[n]=P_N[n-1]\cdot C_u$, where $P_N[n]$ is a power of the noise level during the time frame n, $P_N[n-1]$ is a power of the noise level during the immediately preceding time frame n−1, and $C_u$ is an upward time constant; or (b) if $P_s[n]<P_N[n-1]\cdot C_d$, then $P_N[n]=P_N[n-1]\cdot C_d$, where $C_d$ is a downward time constant; or (c) if neither (a) nor (b) is true, then $P_N[n]=P_s[n]$. In one example, $C_u$ is 3 dB/sec, and $C_d$ is −24 dB/sec.

Figure 5:
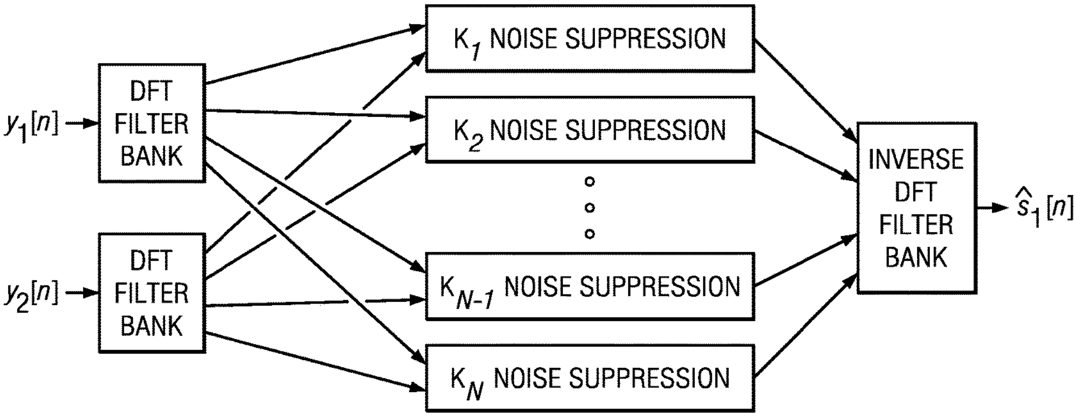
FIG. 5 is an information flow diagram of a post processing operation of FIG. 3.
Figure 6:
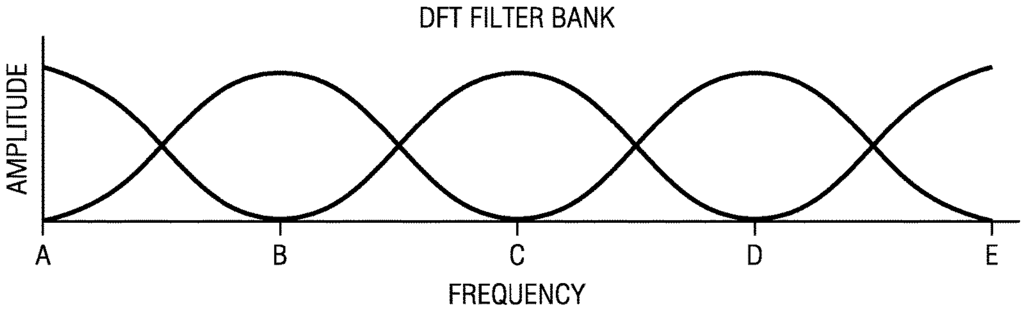
FIG. 6 is a graph of various frequency bands that are applied by a discrete Fourier transform ("DFT") filter bank operation of FIG. 5.

FIG. 5 is an information flow diagram of the post processing operation. FIG. 6 is a graph of various frequency bands that are applied by a discrete Fourier transform ("DFT") filter bank operation of FIG. 5. As shown in FIG. 6, each frequency band partially overlaps its neighboring frequency bands by fifty percent (50%) apiece. For example, in FIG. 6, one frequency band ranges from B Hz to D Hz, and such frequency band partially overlaps: (a) a frequency band that ranges from A Hz to C Hz; and (b) a frequency band that ranges from C Hz to E Hz.

A particular band is referenced as the kth band, where: (a) k is an integer that ranges from 1 through N; and (b) N is a total number of such bands. In the illustrative embodiment, N=64. Referring again to FIG. 5, in the DFT filter bank operation, the DSP 210: (a) receives $y_1[n]$ and $y_2[n]$ from the BSS operation; (b) converts $y_1[n]$ from a time domain to a frequency domain, and decomposes the frequency domain version of $y_1[n]$ into a primary channel of the N bands, which are $y_1[n, 1]$ through $y_1[n, N]$; and (c) converts $y_2[n]$ from time domain to frequency domain, and decomposes the frequency domain version of $y_2[n]$ into a secondary channel of the N bands, which are $y_2[n, 1]$ through $y_2[n, N]$.

As shown in FIG. 5, for each of the N bands, the DSP 210 performs a noise suppression operation, such as a spectral subtraction operation, minimum mean-square error ("MMSE") operation, or maximum likelihood ("ML") operation. For the kth band, such operation is denoted as the $K_k$ noise suppression operation. Accordingly, in the $K_k$ noise suppression operation, the DSP 210: (a) in response to the secondary channel's kth band $y_2[n, k]$, estimates the diffused noise within the primary channel's kth band $y_1[n, k]$; (b) in response to such estimate, computes the kth band's respective noise suppression gain $G[n, k]$ for the time frame n; and (c) generates a respective noise-suppressed version $\hat{s}_1[n, k]$ of the primary channel's kth band $y_1[n, k]$ by applying $G[n, k]$ thereto (e.g., by multiplying $G[n, k]$ and the primary channel's kth band $y_1[n, k]$ for the time frame n). After the DSP 210 generates the respective noise-suppressed versions $\hat{s}_1[n, k]$ of all N bands of the primary channel for the time frame n, the DSP 210 composes $\hat{s}_1[n]$ for the time frame n by performing an inverse of the DFT filter bank operation, in order to convert a sum of those noise-suppressed versions $\hat{s}_1[n, k]$ from a frequency domain to a time domain. In real-time causal implementations of the system 200, a band's G[n, k] is variable per time frame n.

Figure 7:
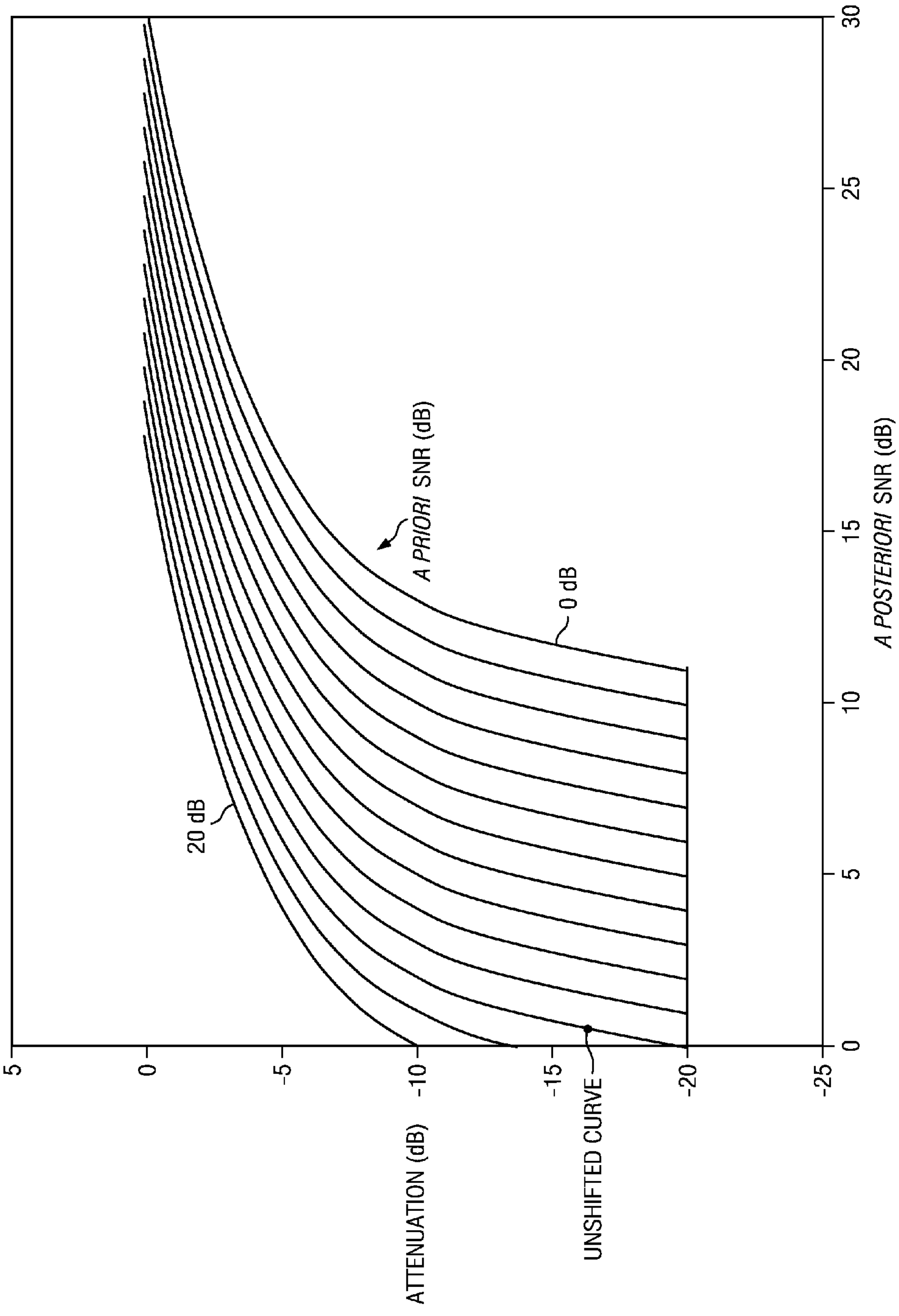
FIG. 7 is a graph of noise suppression gain in response to a signal's a posteriori speech-to-noise ratio ("SNR") and estimated a priori SNR, in accordance with one example of the illustrative embodiments.

FIG. 7 is a graph of noise suppression gain G[n, k] in response to a signal's a posteriori SNR and estimated a priori SNR, in accordance with one example of the illustrative embodiments. Accordingly, in the illustrative embodiments, the DSP 210 computes the kth band's respective noise suppression gain G[n, k] in response to both: (a) a posteriori SNR, which is a logarithmic ratio between a noisy version of the signal's energy (e.g., speech and diffused noise as represented by $y_1[n, k]$) and the noise's energy (e.g., as represented by $y_2[n, k]$); and (b) estimated a priori SNR, which is a logarithmic ratio between a clean version of the signal's energy (e.g., as estimated by the DSP 210) and the noise's energy (e.g., as represented by $y_2[n, k]$). During the time frame n, the kth band's then-current a priori SNR is not yet determined exactly, so the DSP 210 updates its decision-directed estimate of the kth band's then-current a priori SNR in response to G[n−1, k] and $y_1[n-1, k]$ for the immediately preceding time frame n−1.

For the time frame n, the DSP 210 computes:

$$P_{y_1}[n,k]=\alpha\cdot P_{y_1}[n,k]+(1-\alpha)\cdot(y_{1_R}[n,k]^2+y_{1_I}[n,k]^2),\text{ and}$$

$$P_{y_2}[n,k]=\alpha\cdot P_{y_2}[n,k]+(1-\alpha)\cdot(y_{2_R}[n,k]^2+y_{2_I}[n,k]^2),$$

where: (a) $P_{y_1}[n, k]$ is AR smoothed power of $y_1[n, k]$ in the kth band; (b) $P_{y_2}[n, k]$ is AR smoothed power of $y_2[n, k]$ in the kth band; (c) $y_{1_R}[n, k]$ and $y_{1_I}[n, k]$ are real and imaginary parts of $y_1[n, k]$; and (d) $y_{2_R}[n, k]$ and $y_{2_I}[n, k]$ are real and imaginary parts of $y_2[n, k]$. In one example, $\alpha=0.95$.

The DSP 210 computes its estimate of a priori SNR as:

$$\text{a priori SNR}=P_s[n-1,k]/P_{y_2}[n-1,k],$$

where: (a) $P_s[n-1, k]$ is estimated power of clean speech for the immediately preceding time frame n−1; and (b) $P_{y_2}[n-1, k]$ is AR smoothed power of $y_2[n-1, k]$ in the kth band for the immediately preceding time frame n−1.

However, if $P_{y_2}[n-1, k]$ is unavailable (e.g., if the secondary voltage signal $V_2$ is unavailable), then the DSP 210 computes its estimate of a priori SNR as:

$$\text{a priori SNR}=P_s[n-1,k]/P_N[n-1,k],$$

where: (a) $P_N[n-1, k]$ is an estimate of noise level within $y_1[n-1, k]$; and (b) the DSP 210 estimates $P_N[n-1, k]$ in the same manner as discussed hereinbelow in connection with FIG. 8.

The DSP 210 computes $P_s[n-1, k]$ as:

$$P_s[n-1,k]=G[n-1,k]^2\cdot P_{y_1}[n-1,k],$$

where: (a) G[n−1, k] is the kth band's respective noise suppression gain for the immediately preceding time frame n−1; and (b) $P_{y_1}[n-1, k]$ is AR smoothed power of $y_1[n-1, k]$ in the kth band for the immediately preceding time frame n−1.

The DSP 210 computes a posteriori SNR as:

$$\text{a posteriori SNR}=P_{y_1}[n,k]/P_{y_2}[n,k].$$

However, if $P_{y_2}[n, k]$ is unavailable (e.g., if the secondary voltage signal $V_2$ is unavailable), then the DSP 210 computes a posteriori SNR as:

$$\text{a posteriori SNR}=P_{y_1}[n,k]/P_N[n,k],$$

where: (a) $P_N[n, k]$ is an estimate of noise level within $y_1[n, k]$; and (b) the DSP 210 estimates $P_N[n, k]$ in the same manner as discussed hereinbelow in connection with FIG. 8.

In FIG. 7, various spectral subtraction curves show how G[n, k] ("attenuation") varies in response to both a posteriori SNR and estimated a priori SNR. One of those curves ("unshifted curve") is a baseline curve of a relationship between a posteriori SNR and G[n, k]. But the DSP 210 shifts the baseline curve horizontally (either left or right by a variable amount X) in response to estimated a priori SNR, as shown by the remaining curves of FIG. 7. A relationship between curve shift X and estimated a priori SNR was experimentally determined as X=estimated a priori SNR−15 dB.

For example, if estimated a priori SNR is relatively high, then X is positive, so that the DSP 210 shifts the baseline curve left (which effectively increases G[n, k]), because the positive X indicates that $y_1[n, k]$ likely represents a smaller percentage of noise. Conversely, if estimated a priori SNR is relatively low, then X is negative, so that the DSP 210 shifts the baseline curve right (which effectively reduces G[n, k]), because the negative X indicates that $y_1[n, k]$ likely represents a larger percentage of noise. In this manner, the DSP 210 smooths G[n, k] transition and thereby reduces its rate of change, so that the DSP 210 reduces an extent of annoying musical noise artifacts (but without producing excessive smoothing distortion, such as reverberation), while nevertheless updating G[n, k] with sufficient frequency to handle relatively fast changes in the signals $V_1$ and $V_2$. To further achieve those objectives in various embodiments, the DSP 210 shifts the baseline curve horizontally (either left or right by a first variable amount) and/or vertically (either up or down by a second variable amount) in response to estimated a priori SNR, so that the baseline curve shifts in one dimension (e.g., either horizontally or vertically) or multiple dimensions (e.g., both horizontally and vertically).

In one example of the illustrative embodiments, the DSP 210 implements the curve shift X by precomputing an attenuation table of G[n, k] values (in response to various combinations of a posteriori SNR and estimated a priori SNR) for storage on the computer-readable medium 218, so that the DSP 210 determines G[n, k] in real-time operation by reading G[n, k] from such attenuation table in response to a posteriori SNR and estimated a priori SNR. In one version of the illustrative embodiments, the DSP 210 implements the curve shift X by computing G[n, k] as:

$$G[n,k]=\sqrt{}(1-(10^{0.1\cdot CurveSNR})^{0.01},$$

where CurveSNR=X·a posteriori SNR.

However, the DSP 210 imposes a floor on G[n, k] to ensure that G[n, k] is always greater than or equal to a value of the floor, which is programmable as a runtime parameter. In that manner, the DSP 210 further reduces an extent of annoying musical noise artifacts. In the example of FIG. 7, such floor value is −20 dB.

Figure 8:
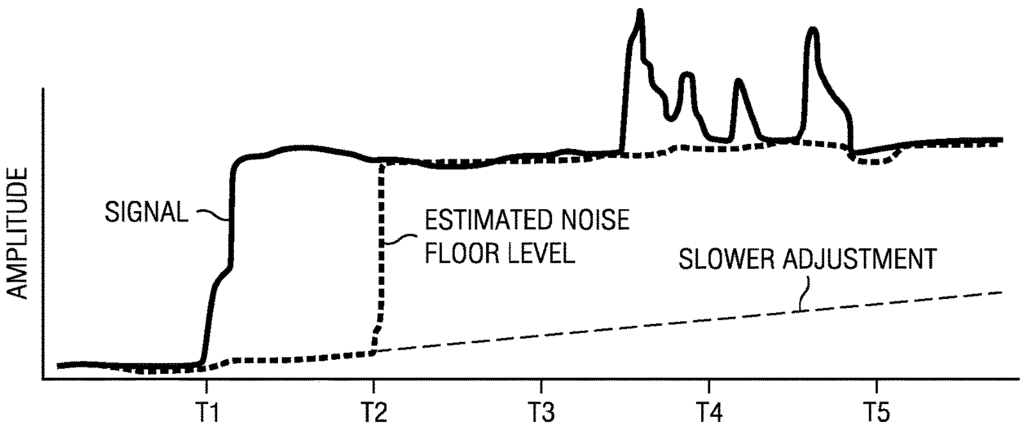
FIG. 8 is a graph that shows example levels of a signal and an estimated noise floor, as they vary over time.

FIG. 8 is a graph that shows example levels of $P_{x_1}[n]$ and $P_N[n]$, as they vary over time, where: (a) $P_{x_1}[n]$ is a power of $x_1[n]$; (b) $P_{x_1}[n]$ is denoted as "signal" in FIG. 8; and (c) $P_N[n]$ is denoted as "estimated noise floor level" in FIG. 8. In the example of FIG. 8, the DSP 210 estimates $P_N[n]$ in response to $P_{x_1}[n]$ for the BSS operation of FIGS. 3 and 4. In another example, if $P_{y_2}[n, k]$ is unavailable (e.g., if the secondary voltage signal $V_2$ is unavailable), then the DSP 210 estimates $P_N[n]$ in response to $P_{y_1}[n]$ (instead of $P_{x_1}[n]$) for the post processing operation of FIGS. 3 and 5, as discussed hereinabove in connection with FIG. 7.

In response to $P_{x_1}[n]$ exceeding $P_N[n]$ by more than a specified amount ("GAP") for more than a specified continuous duration, the DSP 210: (a) determines that such excess is more likely representative of noise level increase instead of speech; and (b) accelerates its adjustment of $P_N[n]$. In the illustrative embodiments, the DSP 210 measures the specified continuous duration as a specified number ("MAX") of consecutive time frames, which aggregately equate to at least such duration (e.g., 0.8 seconds).

In response to $P_{x_1}[n]$ exceeding $P_N[n]$ by less than GAP and/or for less than MAX consecutive time frames (e.g., between a time T3 and a time T5 in the example of FIG. 8), the DSP 210 determines that such excess is more likely representative of speech instead of additional noise. For example, if $P_{x_1}[n] \leq P_N[n] \cdot GAP$, then Count[n]=0, and the DSP 210 clears an initialization flag. In response to the initialization flag being cleared, the DSP 210 estimates $P_N[n]$ according to the time constants $C_u$ and $C_d$ (discussed hereinabove in connection with FIG. 4), so that $P_N[n]$ falls more quickly than it rises.

Conversely, if $P_{x_1}[n] > P_N[n] \cdot GAP$, then Count[n]=Count[n−1]+1. If Count[n]>MAX, then the DSP 210 sets the initialization flag. In response to the initialization flag being set, the DSP 210 estimates $P_N[n]$ with a faster time constant (e.g., in the same manner as the DSP 210 estimates $P_s[n]$ discussed hereinabove in connection with FIG. 4), so that $P_N[n]$ rises approximately as quickly as it falls. In an alternative embodiment, instead of determining whether $P_{x_1}[n] \leq P_N[n] \cdot GAP$, the DSP 210 determines whether $P_{x_1}[n] \leq P_N[n]+GAP$, so that: (a), if $P_{x_1}[n] \leq P_N[n]+GAP$, then Count[n]=0, and the DSP 210 clears the initialization flag; and (b) if $P_{x_1}[n] > P_N[n]+GAP$, then Count[n]=Count[n−1]+1.

In the example of FIG. 8: (a) $P_{x_1}[n]$ quickly rises at a time T1; (b) shortly after $T_1$, $P_{x_1}[n]$ exceeds $P_N[n]$ by more than GAP; (c) at a time T2, more than MAX consecutive time frames have elapsed since T1; and (d) in response to $P_{x_1}[n]$ exceeding $P_N[n]$ by more than GAP for more than MAX consecutive time frames, the DSP 210 sets the initialization flag and estimates $P_N[n]$ with the faster time constant. By comparison, if the DSP 210 always estimated $P_N[n]$ according to the time constants $C_u$ and $C_d$, then the DSP 210 would have adjusted $P_N[n]$ with less precision and less speed (e.g., as shown by the "slower adjustment" line of FIG. 8). Also, in one embodiment, while initially adjusting $P_N[n]$ during its first 0.5 seconds of operation, the DSP 210 sets the initialization flag and estimates $P_N[n]$ with the faster time constant.

In the illustrative embodiments, a computer program product is an article of manufacture that has: (a) a computer-readable medium; and (b) a computer-readable program that is stored on such medium. Such program is processable by an instruction execution apparatus (e.g., system or device) for causing the apparatus to perform various operations discussed hereinabove (e.g., discussed in connection with a block diagram). For example, in response to processing (e.g., executing) such program's instructions, the apparatus (e.g., programmable information handling system) performs various operations discussed hereinabove. Accordingly, such operations are computer-implemented.

Such program (e.g., software, firmware, and/or microcode) is written in one or more programming languages, such as: an object-oriented programming language (e.g., C++); a procedural programming language (e.g., C); and/or any suitable combination thereof. In a first example, the computer-readable medium is a computer-readable storage medium. In a second example, the computer-readable medium is a computer-readable signal medium.

A computer-readable storage medium includes any system, device and/or other non-transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform various operations discussed hereinabove. Examples of a computer-readable storage medium include, but are not limited to: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD-ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform various operations discussed hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof.

Although illustrative embodiments have been shown and described by way of example, a wide range of alternative embodiments is possible within the scope of the foregoing disclosure.

What is claimed is:

1. A method comprising:

attenuating noise by electronic circuitry components performing operations comprising: receiving a first voltage signal that represents speech and the noise, wherein the noise includes directional noise and diffused noise; receiving a second voltage signal that represents the noise and leakage of the speech; in response to the first and second voltage signals, generating a first channel that represents the speech and the diffused noise while attenuating most of the directional noise from the first voltage signal, and generating a second channel that represents the noise while attenuating most of the speech from the second voltage signal; in response to the first and second channels, generating at least N frequency bands of an output channel that represents the speech while attenuating most of the noise from the first channel, wherein N is an integer number >3; and, in response to the output channel, outputting an electrical signal to communicate the speech while attenuating most of the noise from the first channel;

wherein k is an integer number that ranges from 1 through N, and wherein generating each ("kth") of the N frequency bands of the output channel for a time frame n includes:

within the kth frequency band of the output channel, determining an estimated a priori speech-to-noise ratio ("SNR") of the kth frequency band by computing a ratio between: an estimated power of a clean version of the speech within the kth frequency band for an immediately preceding time frame n−1; and a power of the noise within the kth frequency band for the immediately preceding time frame n−1;

within the kth frequency band of the output channel, determining an a posteriori SNR of the kth frequency band by computing a ratio between: a power of a noisy version of the speech within the kth frequency band for the time frame n; and a power of the noise within the kth frequency band for the time frame n;

in response to the kth frequency band's estimated a priori SNR and the kth frequency band's a posteriori SNR, determining a gain of the kth frequency band for the time frame n; and generating the kth frequency band of the output channel for the time frame n in response to multiplying: the kth frequency band's gain for the time frame n; and the kth frequency band of the output channel for the time frame n.

2. The method of claim 1, wherein the frequency bands include at least first and second frequency bands that partially overlap one another.

3. The method of claim 1, and comprising: performing a filter bank operation for converting a time domain version of the first voltage signal to the frequency bands of the output channel and for converting a time domain version of the second voltage signal to the frequency bands of the output channel.

4. The method of claim 3, and comprising: generating the output channel, wherein generating the output channel includes performing an inverse of the filter bank operation for converting a sum of the frequency bands of the output channel to a time domain.

5. The method of claim 1, wherein generating the kth frequency band of the output channel for a time frame n includes: from the second channel, determining the noise for the immediately preceding time frame n−1, and determining the noise for the time frame n.

6. The method of claim 1, wherein generating the kth frequency band of the output channel for a time frame n includes: determining the estimated power of the clean version of the speech for the immediately preceding time frame n−1 by multiplying:

a square of a gain for the immediately preceding time frame n−1; and a power of a noisy version of the speech for the immediately preceding time frame n−1.

7. The method of claim 1, and comprising: imposing a floor on the gain for the time frame n.

8. The method of claim 1, wherein determining the gain for the time frame n includes: in response to the estimated a priori SNR, shifting a curve of a relationship between the a posteriori SNR and the gain for the time frame n.

9. A system comprising:

electronic circuitry components coupled to attenuate noise by performing operations comprising: receiving a first voltage signal that represents speech and the noise, wherein the noise includes directional noise and diffused noise; receiving a second voltage signal that represents the noise and leakage of the speech; in response to the first and second voltage signals, generating a first channel that represents the speech and the diffused noise while attenuating most of the directional noise from the first voltage signal, and generating a second channel that represents the noise while attenuating most of the speech from the second voltage signal; in response to the first and second channels, generating at least N frequency bands of an output channel that represents the speech while attenuating most of the noise from the first channel, wherein N is an integer number >3; and, in response to the output channel, outputting an electrical signal to communicate the speech while attenuating most of the noise from the first channel;

wherein k is an integer number that ranges from 1 through N, and wherein generating each ("kth") of the N frequency bands of the output channel for a time frame n includes:

within the kth frequency band of the output channel, determining an estimated a priori speech-to-noise ratio ("SNR") of the kth frequency band by computing a ratio between: an estimated power of a clean version of the speech within the kth frequency band for an immediately preceding time frame n−1; and a power of the noise within the kth frequency band for the immediately preceding time frame n−1;

within the kth frequency band of the output channel, determining an a posteriori SNR of the kth frequency band by computing a ratio between: a power of a noisy version of the speech within the kth frequency band for the time frame n; and a power of the noise within the kth frequency band for the time frame n;

in response to the kth frequency band's estimated a priori SNR and the kth frequency band's a posteriori SNR, determining a gain of the kth frequency band for the time frame n; and generating the kth frequency band of the output channel for the time frame n in response to multiplying: the kth frequency band's gain for the time frame n; and the kth frequency band of the output channel for the time frame n.

10. The system of claim 9, wherein the frequency bands include at least first and second frequency bands that partially overlap one another.

11. The system of claim 9, wherein the electronic circuitry components are for: performing a filter bank operation for converting a time domain version of the first voltage signal to the frequency bands of the output channel and for converting a time domain version of the second voltage signal to the frequency bands of the output channel.

12. The system of claim 11, wherein the electronic circuitry components are for: generating the output channel, wherein generating the output channel includes performing an inverse of the filter bank operation for converting a sum of the frequency bands of the output channel to a time domain.

13. The system of claim 9, wherein generating the kth frequency band of the output channel for a time frame n includes: from the second channel, determining the noise for the immediately preceding time frame n−1, and determining the noise for the time frame n.

14. The system of claim 9, wherein generating the kth frequency band of the output channel for a time frame n includes: determining the estimated power of the clean version of the speech for the immediately preceding time frame n−1 by multiplying:

a square of a gain for the immediately preceding time frame n−1; and a power of a noisy version of the speech for the immediately preceding time frame n−1.

15. The system of claim 9, wherein the electronic circuitry components are for: imposing a floor on the gain for the time frame n.

16. The system of claim 9, wherein determining the gain for the time frame n includes: in response to the estimated a priori SNR, shifting a curve of a relationship between the a posteriori SNR and the gain for the time frame n.

17. A non-transitory computer-readable medium storing instructions that are processable by electronic circuitry components of an instruction execution apparatus for causing the apparatus to attenuate noise by performing operations comprising:

receiving a first voltage signal that represents speech and the noise, wherein the noise includes directional noise and diffused noise; receiving a second voltage signal that represents the noise and leakage of the speech; in response to the first and second voltage signals, generating a first channel that represents the speech and the diffused noise while attenuating most of the directional noise from the first voltage signal, and generating a second channel that represents the noise while attenuating most of the speech from the second voltage signal; in response to the first and second channels, generating at least N frequency bands of an output channel that represents the speech while attenuating most of the noise from the first channel, wherein N is an integer number >3; and, in response to the output channel, outputting an electrical signal to communicate the speech while attenuating most of the noise from the first channel;

wherein k is an integer number that ranges from 1 through N, and wherein generating each ("kth") of the N frequency bands of the output channel for a time frame n includes:

within the kth frequency band of the output channel, determining an estimated a priori speech-to-noise ratio ("SNR") of the kth frequency band by computing a ratio between: an estimated power of a clean version of the speech within the kth frequency band for an immediately preceding time frame n−1; and a power of the noise within the kth frequency band for the immediately preceding time frame n−1;

within the kth frequency band of the output channel, determining an a posteriori SNR of the kth frequency band by computing a ratio between: a power of a noisy version of the speech within the kth frequency band for the time frame n; and a power of the noise within the kth frequency band for the time frame n;

in response to the kth frequency band's estimated a priori SNR and the kth frequency band's a posteriori SNR, determining a gain of the kth frequency band for the time frame n; and generating the kth frequency band of the output channel for the time frame n in response to multiplying: the kth frequency band's gain for the time frame n; and the kth frequency band of the output channel for the time frame n.

18. The computer-readable medium of claim 17, wherein the frequency bands include at least first and second frequency bands that partially overlap one another.

19. The computer-readable medium of claim 17, wherein the method comprises: performing a filter bank operation for converting a time domain version of the first voltage signal to the frequency bands of the output channel and for converting a time domain version of the second voltage signal to the frequency bands of the output channel.

20. The computer-readable medium of claim 19, wherein the method comprises: generating the output channel, wherein generating the output channel includes performing an inverse of the filter bank operation for converting a sum of the frequency bands of the output channel to a time domain.

21. The computer-readable medium of claim 17, wherein generating the kth frequency band of the output channel for a time frame n includes: from the second channel, determining the noise for the immediately preceding time frame n−1, and determining the noise for the time frame n.

22. The computer-readable medium of claim 17, wherein generating the kth frequency band of the output channel for a time frame n includes: determining the estimated power of the clean version of the speech for the immediately preceding time frame n−1 by multiplying:

a square of a gain for the immediately preceding time frame n−1; and a power of a noisy version of the speech for the immediately preceding time frame n−1.

23. The computer-readable medium of claim 17, wherein the method comprises: imposing a floor on the gain for the time frame n.

24. The computer-readable medium of claim 17, wherein determining the gain for the time frame n includes: in response to the estimated a priori SNR, shifting a curve of a relationship between the a posteriori SNR and the gain for the time frame n.

* * * * *